(12) United States Patent
Kim et al.

(10) Patent No.: US 12,012,069 B2
(45) Date of Patent: Jun. 18, 2024

(54) USER AUTHENTICATION METHOD FOR CONSTRUCTION EQUIPMENT

(71) Applicant: HD HYUNDAI INFRACORE CO., LTD., Incheon (KR)

(72) Inventors: Jihoon Kim, Seoul (KR); Wooseok Seo, Bucheon-si (KR); Wookyoung Choi, Yongin-si (KR); Hongcheol Yun, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 77 days.

(21) Appl. No.: 17/797,889

(22) PCT Filed: Feb. 2, 2021

(86) PCT No.: PCT/KR2021/001378
§ 371 (c)(1),
(2) Date: Aug. 5, 2022

(87) PCT Pub. No.: WO2021/158002
PCT Pub. Date: Aug. 12, 2021

(65) Prior Publication Data
US 2023/0094085 A1 Mar. 30, 2023

(30) Foreign Application Priority Data
Feb. 5, 2020 (KR) .................... 10-2020-0013615

(51) Int. Cl.
*B60R 25/24* (2013.01)
*B60R 25/25* (2013.01)
*G07C 9/00* (2020.01)

(52) U.S. Cl.
CPC ............. *B60R 25/24* (2013.01); *B60R 25/25* (2013.01); *G07C 9/00309* (2013.01);
(Continued)

(58) Field of Classification Search
CPC ....... B60R 25/24; B60R 25/25; B60R 25/252; B60R 2325/20; B60R 2325/308;
(Continued)

(56) References Cited

U.S. PATENT DOCUMENTS 5,708,308 A * 1/1998 Katayama ............... B60R 25/04
235/382.5
8,837,724 B2 * 9/2014 Rose ....................... G06F 21/35
713/169

(Continued)

FOREIGN PATENT DOCUMENTS

JP 2003343133 A 12/2003
KR 101360529 B1 * 2/2014
(Continued)

OTHER PUBLICATIONS

International Search Report for related International Application No. PCT/KR2021/001378; report dated Aug. 12, 0221; (6 pages).
(Continued)

*Primary Examiner* — Adnan Aziz
(74) *Attorney, Agent, or Firm* — K&L Gates LLP

(57) ABSTRACT

The present disclosure relates to a user authentication method for construction equipment, capable of preventing theft of construction equipment. The user authentication method for construction equipment according to an embodiment of the present invention includes: a user authentication method for construction equipment includes: a user information registration step for registering a user identification information provided from a user device; a digital key issuance step for, upon request for use of the construction equipment from the user device, generating a digital key corresponding to the construction equipment and transmitting the generated digital key to the user device; and an equipment authentication step for allowing the use of the construction equipment when the user device having receive
(Continued)

the digital key completes authentication of the identification information through the digital key.

13 Claims, 3 Drawing Sheets

(52) U.S. Cl.
CPC ..... *B60R 2325/20* (2013.01); *B60R 2325/308* (2013.01); *G07C 2009/00507* (2013.01)

(58) Field of Classification Search
CPC . B66C 13/18; B66C 15/00; B66F 9/24; B66F 17/003; G07C 9/00309; G07C 2009/00507; G06F 21/32; G06F 21/33; G06F 17/00; G06Q 30/018; G06Q 30/0645; G06Q 50/08; G06Q 50/30; H04L 9/3231; H04L 63/068; H04L 63/0807; H04L 63/0861; H04L 63/10; H04L 63/108; H04L 67/12; H04W 12/041; E02F 9/24; E02F 9/265

See application file for complete search history.

(56) References Cited

U.S. PATENT DOCUMENTS

| | | | |
|---|---|---|---|
| 9,688,247 | B1 | 6/2017 | Jayaraman et al. |
| 10,501,055 | B1* | 12/2019 | Yi .................. B60R 25/257 |
| 2014/0129113 | A1* | 5/2014 | Van Wiemeersch .... F02D 28/00 701/1 |
| 2016/0142402 | A1* | 5/2016 | Kim ................ H04L 63/0853 726/4 |
| 2019/0268336 | A1* | 8/2019 | Gomi ................ H04W 12/069 |
| 2020/0406859 | A1* | 12/2020 | Hassani ............. G06Q 30/0185 |
| 2021/0073367 | A1* | 3/2021 | Kim .................. B60R 25/252 |
| 2022/0292411 | A1* | 9/2022 | Choi .................. G06Q 30/06 |

FOREIGN PATENT DOCUMENTS

| | | |
|---|---|---|
| KR | 101360529 B1 | 2/2014 |
| KR | 1020140142786 A | 12/2014 |
| KR | 102020011328 A | 2/2020 |

OTHER PUBLICATIONS

Written Opinion for related International Application No. PCT/KR2021/001378; report dated Aug. 12, 0221; (6 pages).

* cited by examiner

USER AUTHENTICATION METHOD FOR CONSTRUCTION EQUIPMENT

CROSS-REFERENCE TO RELATED APPLICATIONS

The present application is a National Stage of International Application No. PCT/KR2021/001378 filed on Feb. 2, 2021, which claims the benefit of Korean Patent Application No. 10-2020-0013615, filed on Feb. 5, 2020, the entire contents of each hereby incorporated by reference.

FIELD

The present disclosure relates to construction equipment, and particularly, to a user authentication method for construction equipment capable of preventing theft of the construction equipment.

BACKGROUND

In recent times, high-priced construction equipment, such as excavators, forklifts, cranes, or wheel loaders, is frequently stolen. In particular, construction equipment disposed at the work site are often left unattended at the work site during work, so they are more likely to be stolen compared to stored construction equipment.

Korean Patent Application No. 10-2006-0102233 proposes a technology for preventing theft of construction equipment using a GPS terminal.

SUMMARY

According to embodiments of the present disclosure, a user authentication method for construction equipment capable of preventing theft of the construction equipment may be provided.

According to an embodiment of the present disclosure, a user authentication method for construction equipment includes: a user information registration step for registering a user identification information provided from a user device; a digital key issuance step for, upon request for use of the construction equipment from the user device, generating a digital key corresponding to the construction equipment and transmitting the generated digital key to the user device; and an equipment authentication step for allowing the use of the construction equipment when the user device having receive the digital key completes authentication of the identification information through the digital key.

The user identification information may include a biometric information, and the user information registration step may include: receiving the biometric information from the user device through confirmation of an owner device of an owner who owns the construction equipment; and registering the received biometric information in a server.

The digital key issuance step may include: receiving a construction equipment use request message from the user device through confirmation of an owner device of an owner who owns the construction equipment; and transmitting, to the user device, the digital key generated according to the construction equipment use request message from the user device.

The construction equipment use request message may include a use time for the construction equipment.

The digital key issuance step may further include: transmitting a construction equipment list to the user device, upon receiving the construction equipment use request message from the user device through confirmation of the owner device.

The generating of the digital key according to the construction equipment use request message from the user device may include: when construction equipment is selected from the construction equipment list by the user device, generating the digital key corresponding to the selected construction equipment.

The digital key issuance step may further include: updating the construction equipment list and a digital key issuance status for each construction equipment and storing it in a server.

The digital key issuance step may further include: transmitting the construction equipment list and the digital key issuance status for each construction equipment to the owner device.

The equipment authentication step may include: receiving the identification information from the user device having received the digital key; and allowing the use of the construction equipment for a use time requested by the user device.

The allowing of the use of the construction equipment may include: switching the construction equipment to a startable state.

The user authentication method for construction equipment may further include: starting-on the construction equipment, wherein a remaining use time for the construction machine is transmitted to at least one of the construction equipment in a start-on state and the user device.

The equipment authentication step may further include: transmitting, to the user device, a start-up available message indicating that the construction equipment is switched to the startable state.

The start-up available message may include a start-up input available time.

The user authentication method for construction equipment may further include: when the construction equipment is not started within the start-up input available time, switching the construction equipment into a non-startable state.

The user authentication method for construction equipment may further include: after the requested use time expires, turning off the construction equipment and then switching the construction equipment into a non-startable state.

The user authentication method for construction equipment may further include: before turning off the construction equipment, transmitting a turn-off warning message informing in advance that the construction equipment is to be turned off to at least one of the user device and the construction equipment.

A value of the digital key may vary depending on a reception time of the server receiving the use request for the construction equipment from the user device.

The user authentication method for construction equipment may further include: before the user information registration step, an owner information and equipment information registration step for receiving and registering an owner information and an equipment information of the construction equipment from an owner device of an owner who owns the construction equipment.

According to an embodiment of the present disclosure, a user authentication method for construction equipment includes: a user information registration step for receiving a user identification information from a user device through confirmation of an owner device of an owner who owns the construction equipment, and registering the received identification information in a server; a digital key issuance step for receiving a construction equipment use request message from the user device through confirmation of the owner device, and transmitting, to the user device, a digital key generated according to the construction equipment use request message from the user device; and an equipment authentication step for allowing the use of the construction equipment when the user device having receive the digital key completes authentication of the identification information through the digital key.

A user authentication method for construction equipment according to an embodiment of the present disclosure provides the following effects.

According to an embodiment of the present disclosure, it is possible to start the construction equipment only through authentication of a digital key and pre-registered user identification information. Accordingly, theft of construction equipment may be prevented.

In addition, since the digital key does not belong to a specific construction equipment, user's convenience and security may be improved.

DETAILED DESCRIPTION

Figure 1:
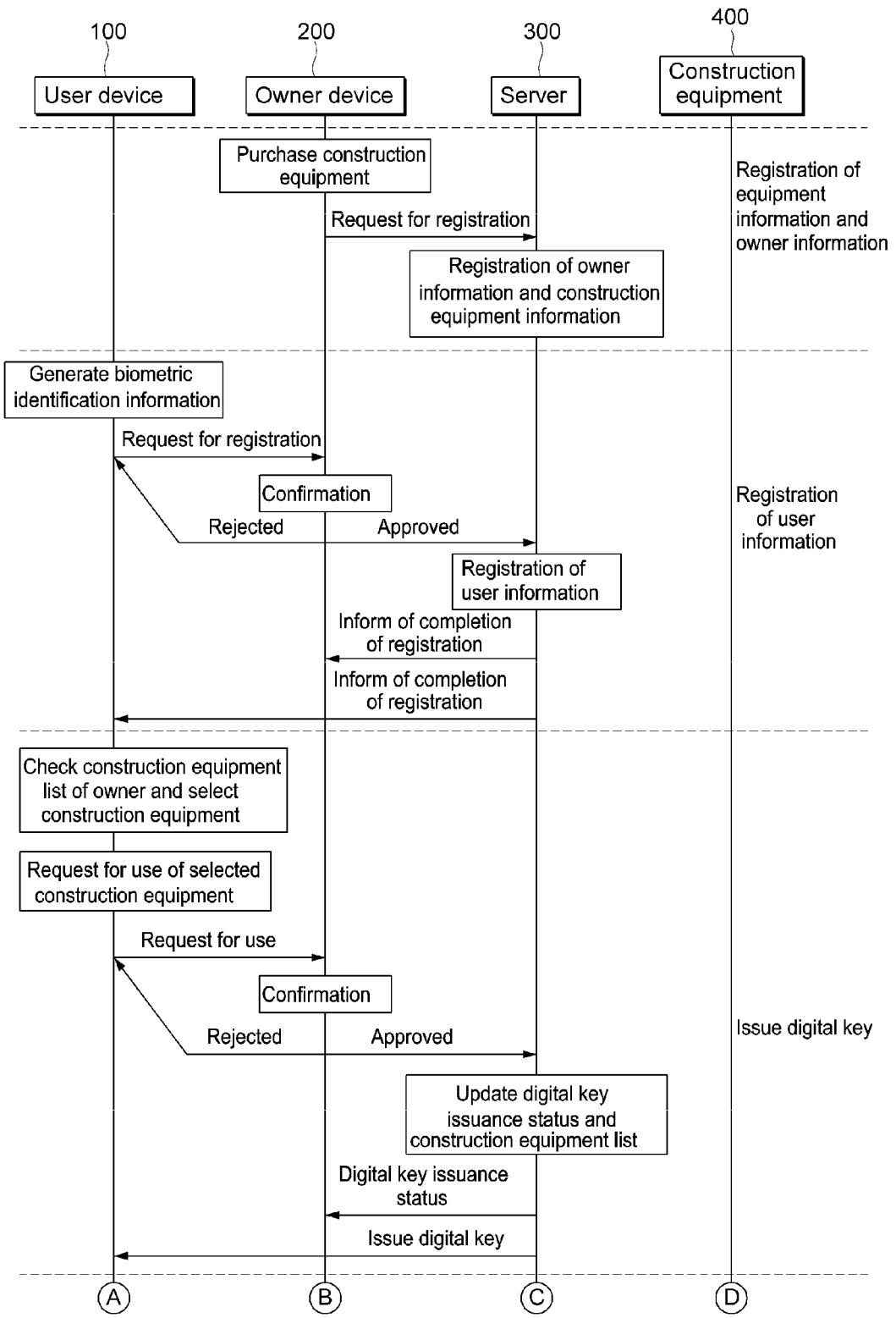
FIGS. 1 and 2 are views for explaining a user authentication method for construction equipment according to an embodiment of the present disclosure.

Advantages and features of the present disclosure and methods of achieving them will become apparent with reference to embodiments described below in detail in conjunction with the accompanying drawings. However, the present disclosure is not limited to the embodiments disclosed below, but will be implemented in various different forms, and only these embodiments allow the disclosure of the present disclosure to be complete and are provided to fully inform those of ordinary skill in the art to which the present disclosure belongs, and the present disclosure is only defined by the scope of the claims. Accordingly, in some embodiments, well-known process steps, well-known device structures, and well-known techniques have not been specifically described in order to avoid obscuring the present disclosure. Like reference numerals refer to like elements throughout the specification.

In order to clearly express various layers and regions in the drawings, the thicknesses are enlarged. Throughout the specification, like reference numerals are assigned to similar parts.

As used herein, terms such as first, second, third, and the like may be used to describe various components, but these components are not limited by the terms. The above terms are used for the purpose of distinguishing one component from other components. For example, without departing from the scope of the present disclosure, a first component may be referred to as a second or third component, and similarly, the second or third component may be alternately named.

Unless otherwise defined, all terms (including technical and scientific terms) used herein may be used with the meaning commonly understood by those of ordinary skill in the art to which the present disclosure belongs. In addition, terms defined in a commonly used dictionary are not to be interpreted ideally or excessively unless clearly defined in particular.

Hereinafter, a user authentication method for construction equipment according to an embodiment of the present disclosure will be described in detail with reference to FIGS. 1 to 3.

Figure 2:
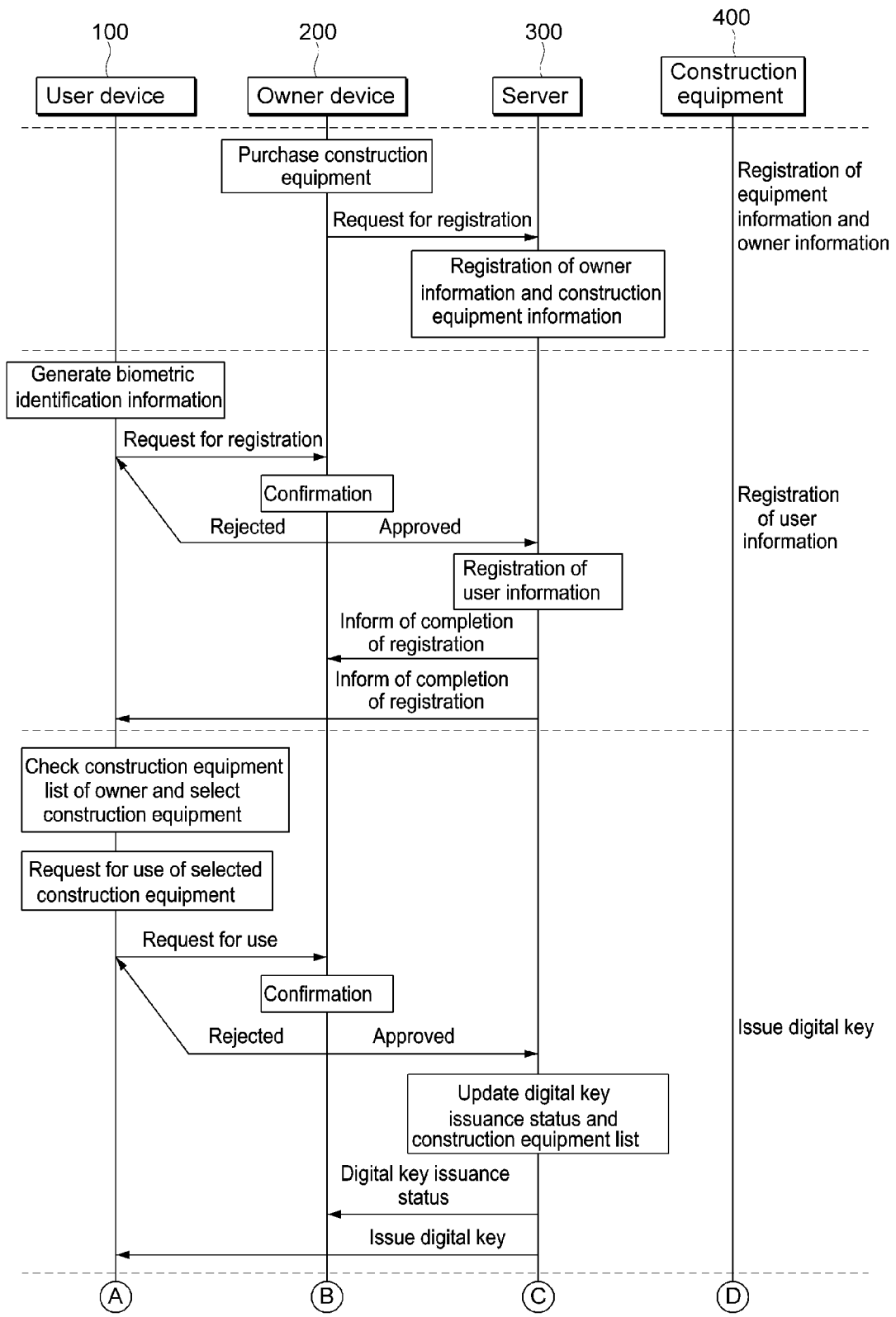

FIGS. 1 and 2 are views for explaining a user authentication method for construction equipment 400 according to an embodiment of the present disclosure.

A user device 100 may be a user device for renting and using construction equipment 400 of an owner. The user device 100 may include, for example, a portable terminal such as a smart phone.

An owner device 200 may be a device of the owner who owns the construction equipment 400. This owner device 200 may include, for example, a portable terminal such as a smart phone.

A server 300 may register, store, update, and manage various information such as user information, owner information, and construction equipment information. Such a server 300 may be provided by, for example, a service provider.

The construction equipment 400 may be, for example, a crane, a wheel loader, an excavator, a forklift, and the like.

The user authentication method for construction equipment 400 according to an embodiment of the present disclosure may include, as illustrated in FIGS. 1 and 2, an equipment information and owner information registration step, a user information registration step, a digital key issuance step, an equipment authentication step, an equipment start-on step and an equipment turn-off step.

First, with reference to FIG. 1, the equipment information and owner information registration step will be described in detail as follows.

The owner who owns the construction equipment 400 may request registration of various types of information by communicating with the server 300 through the owner device 200. For example, the owner may provide the server 300 with an owner information and an information about the construction equipment 400 owned by the owner through an application installed on the owner device 200, and request registration of the provided owner information and construction equipment information.

The server 300 stores and registers the owner information and the construction equipment information provided from the owner device 200.

Next, with reference to FIG. 1, the user information registration step will be described in detail as follows.

A user who wants to use the construction equipment 400 may communicate with the owner device 200 through the user device 100 to request registration of a user identification information. As used herein, the user identification information may include biometric information. For example, the user may generate biometric information by utilizing an application (hereinafter, referred to as a user application) installed in the user device 100, and transmits the generated biometric information to the owner device 200 through the user application, thereby requesting for the registration of the biometric information. As used herein, the biometric information may include, for example, at least one of well-known biometric information such as a user's fingerprint, face, heartbeat, and iris.

The owner may check the biometric information through the owner device 200 that has received the user's biometric information. The owner may approve or reject the registration request for the received biometric information by the owner device 200. If the registration request for the received biometric information is rejected by the owner device 200, a message regarding the rejection may be transmitted to the user device 100.

On the other hand, when the registration request for the received biometric information is approved by the owner device 200, the server 300 receives, stores and registers the user's biometric information through the owner device 200. Then, the server 300 transmits, to at least one of the owner device 200 and the user device 100, a registration completion message informing that the biometric information is registered. For example, the server 300 transmits the registration completion message to each of the owner device 200 and the user device 100.

Next, with reference to FIG. 1, the digital key issuance step will be described in detail as follows.

Upon receiving the registration completion message, the user device 100 may display an owner's construction equipment list. When the owner owns a plurality of construction equipment 400, a status of the plurality of construction equipment 400 may be displayed in the construction equipment list. For example, construction equipment 400 currently in use (hereinafter, non-idle construction equipment) and construction equipment 400 not in use (hereinafter, idle construction equipment) may be displayed separately. Non-idle construction equipment may not be selected, and idle construction equipment may be selected. As another example, only idle construction equipment may appear in the construction equipment list. In an embodiment, the construction equipment list may further include users and use time (e.g., time to use) for non-idle construction equipment.

The user may transmit a use request message (hereinafter, referred to as a construction equipment use request message) for a selected construction equipment 400 (i.e., idle construction equipment) to the owner device 200 through the user device 100. In this case, the construction equipment use request message may include a use time for the selected construction equipment 400. As used herein, the use time for the construction equipment 400 may be set, for example, in units of days. However, the present disclosure is not limited thereto, and the use time may be set, for example, in units of hours, or otherwise, may be input as a specific time. As a specific example, the use time may be set, for example, 1 day, 4 hours and 30 minutes.

The owner may confirm the use request for the construction equipment 400 through the owner device 200 that has received the construction equipment use request message. The owner may approve or reject the received construction equipment use request through the owner device 200. If the received construction equipment use request is rejected by the owner device 200, a message regarding the rejection may be transmitted to the user device 100.

On the other hand, when the received construction equipment use request is approved by the owner device 200, the server 300 generates a digital key for the construction equipment 400 selected by the user and transmits the generated digital key to the user device 100 of the user. As used herein, the digital key may have a different value depending on a reception time of the construction equipment use request message received by the server 300. Accordingly, when two construction equipment use requests are made for the same construction equipment, values of the digital keys corresponding to the same construction equipment may be different from each other according to the reception time of each construction equipment use request. For example, when a use request for a first construction equipment 400 as of Jan. 2, 2020 is received by the server 300, the server 300 may transmit the digital key of a first value to the user device 100, and on the other hand, when a use request for the first construction equipment 400 is received by the server 300 as of Jan. 3, 2020, the server 300 may transmit the digital key of a second value different from the first value to the user device 100. On the other hand, the value of the digital key corresponding to the same construction equipment may vary even in units of hours or minutes instead of days. As such, the value of a specific digital key does not belong to a specific construction equipment.

The digital key issued from the server 300 may be stored in, for example, the user application of the user device 100. In addition, the server 300 updates existing information based on the user, the idle construction equipment selected by the user, the use time for the idle equipment selected by the user, and the digital key issued corresponding to the selected idle construction equipment. For example, the server 300 may switch the selected idle construction equipment, from among idle construction equipment of the owner, into a non-idle construction equipment 400, and update information about the user and use time for the construction equipment switched to the non-idle construction equipment, thereby keeping the information in the construction equipment list up to date. In addition, when the owner rents a plurality of construction equipment 400, the server 300 organizes and updates digital keys issued for the plurality of construction equipment 400 for each construction equipment, thereby keeping the information on an issuance status of the digital key up to date.

The server 300 may transmit the above-mentioned latest construction equipment list and digital key issuance status to the owner device 200. In addition, the server 300 may transmit, to the owner device 200, a digital key transmission completion message indicating that the digital key for the construction equipment 400 has been transmitted to the user device 100.

Next, with reference to FIG. 2, the equipment authentication step will be described in detail as follows.

The user may perform biometric authentication based on the digital key received by the user device 100. For example, when the biometric information registered in the biometric information registration step described above is a user's fingerprint, the user may perform fingerprint authentication through the received digital key.

When the biometric authentication by the user is successfully completed, a biometric authentication signal according to the biometric authentication may be transmitted to the construction equipment 400. In this case, the biometric authentication signal may be transmitted from the user device 100 to the construction equipment 400 through, for example, a short-range wireless communication method such as low-power Bluetooth. As a specific example, the biometric authentication signal from the user device 100 may be transmitted to a vehicle control unit (VCU) of the construction equipment 400. Meanwhile, when the biometric authentication of the user device 100 fails, the biometric authentication signal is not generated. Accordingly, if the biometric authentication fails, the biometric authentication signal is not transmitted to the construction equipment 400.

The construction equipment 400 that has received the biometric authentication signal is switched to a startable state. In such a case, the construction equipment 400 (e.g., the vehicle control unit of the construction equipment 400) that has received the biometric authentication signal transmits a start-up available message informing of the startable state of the construction equipment 400 to at least one of a display unit of the construction equipment 400 and the user device 100. In this case, the display unit of the construction equipment 400 may display the start-up available message on an auxiliary window in the form of a pop-up.

The above-described start-up available message may include a start-up time limit indicating a time limit of a start-up input. The start-up time limit may be, for example, 5 minutes. If a start-up operation (e.g., pressing of a start button) is not performed within the time limit, the construction equipment 400 is switched into a non-startable state. In this case, when the biometric authentication process described above is performed again and the authentication signal is successfully transmitted to the construction equipment 400, the construction equipment 400 may be switched to the startable state again.

Next, with reference to FIG. 2, the equipment start-on step will be described in detail as follows.

When the user performs a start-up operation of the construction equipment 400 within the start-up input time limit and inputs a start to the construction equipment 400, the construction equipment 400 is started. For example, when the user presses the start button of the construction equipment 400, the construction equipment 400 may be started-on (e.g., turned on). In such a case, the construction equipment 400 (e.g., the vehicle control unit of the construction equipment 400) in a start-on state may transmit a remaining use time for the construction equipment 400 to at least one of the display unit of the construction equipment 400 and the user device 100. The remaining time may be displayed in a manner of counting down in seconds or minutes from the time when the construction equipment 400 is switched to the start-on state.

Next, with reference to FIG. 2, the equipment turn-off step will be described in detail as follows.

When the use time for the construction equipment 400 expires, the construction equipment 400 is turned off. At the same time, the construction equipment 400 is switched into a non-startable state. That is, when the use time for the construction equipment 400 expires, the construction equipment 400 is forcibly turned off, and after the forced turning off, the start is not input to the construction equipment 400 even if the start-up operation is performed.

That is, when the construction equipment 400 is forcibly turned off because the use time for the construction equipment 400 expires, restart is possible through the digital key issuance step and the equipment authentication step described above. In such a case, as described above, the value of the digital key in the digital key issuance step may be determined according to the reception time of the construction equipment use request message input to the server 300.

Figure 3:
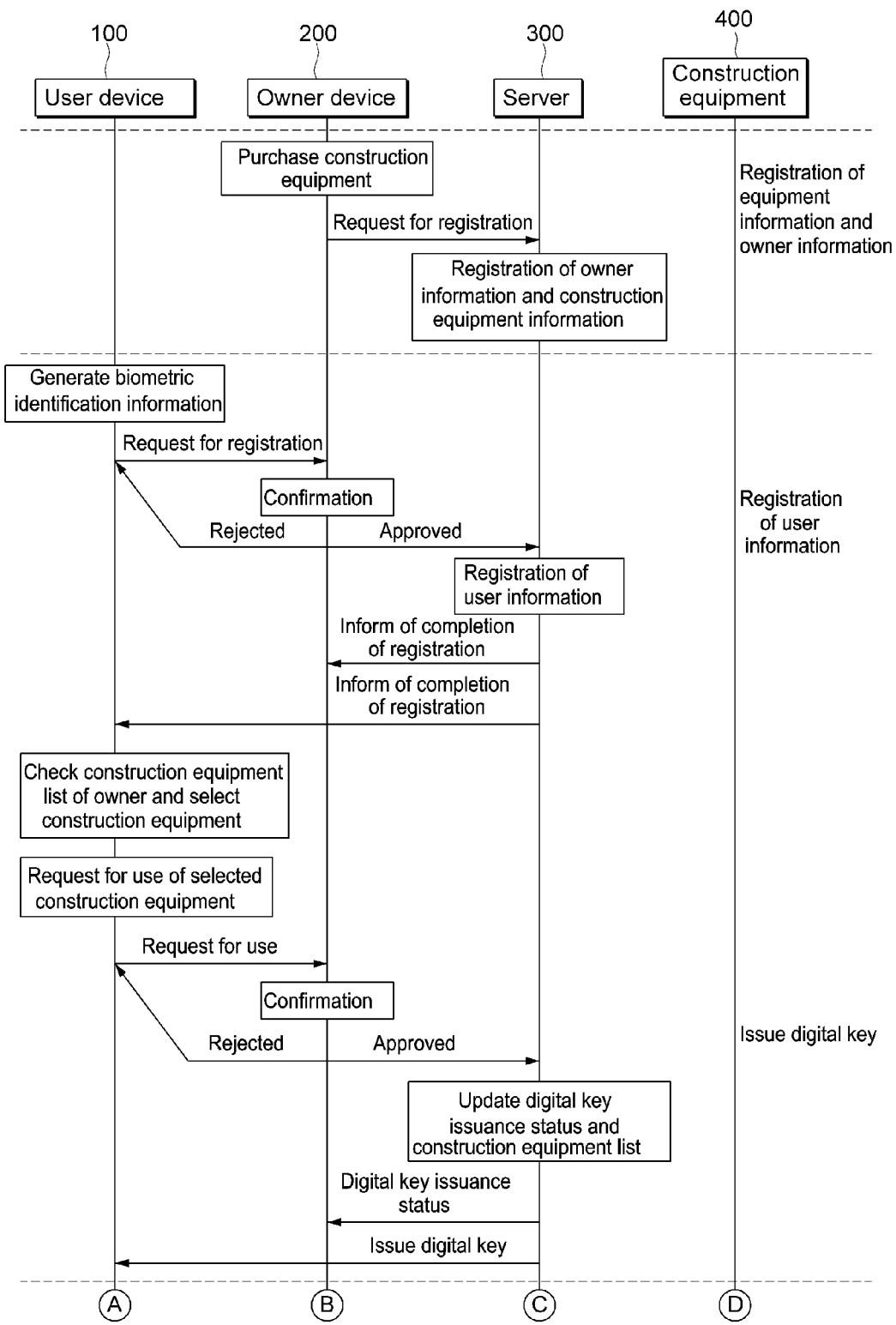
FIG. 3 is a view for explaining a user authentication method for construction equipment according to another embodiment of the present disclosure.

FIG. 3 is a view for explaining a user authentication method for construction equipment 400 according to another embodiment of the present disclosure.

The user authentication method of FIG. 3 may be performed after the user authentication method of FIG. 1. Since the equipment authentication step and the equipment start-on step for FIG. 3 are the same as the equipment authentication step and the equipment start-on step for FIG. 2, the equipment authentication step and the equipment start-on step for FIG. 3 will refer to FIG. 2 and the related descriptions.

As illustrated in FIG. 3, before forcible turning off the construction equipment 400 as the use time expires, the construction equipment 400 (e.g., the vehicle control unit of the construction equipment 400) may transmit a turn-off warning message to at least one of the display unit of the construction equipment 400 and the user device 100. The turn-off warning message may be transmitted several seconds to several hours before the construction equipment 400 is turned off. In this case, the user may easily recognize that the use time for the construction equipment 400 is going to expire soon, so that the user may have time to move the construction equipment 400 to a safe place in advance before the construction equipment 400 is turned off.

This warning message may be transmitted after displaying the remaining use time for the construction equipment 400 and before expiring of the use time.

The present disclosure described above is not limited to the above-described embodiments and the accompanying drawings, and it will be apparent to those skilled in the technical field to which the present disclosure pertains that various substitutions, modifications and changes are possible without departing from the technical spirit of the present disclosure.

REFERENCE NUMERAL

100: user device 200: owner device
300: server 400: construction equipment The present disclosure may be used to provide a user authentication method for construction equipment that may prevent theft of the construction equipment.

The invention claimed is:

1. A user authentication method for construction equipment, the method comprising:
   a user information registration step for registering a user identification information provided from a user device;
   a digital key issuance step for, upon request for use of the construction equipment from the user device, generating a digital key corresponding to the construction equipment and transmitting the generated digital key to the user device; and
   an equipment authentication step for allowing the use of the construction equipment when the user device having receive the digital key completes authentication of the user identification information through the digital key,
   wherein the equipment authentication step comprises:
      receiving the user identification information from the user device having received the digital key; and
      allowing the use of the construction equipment for a use time requested by the user device,
   wherein the allowing of the use of the construction equipment comprises switching the construction equipment to a startable state,
   wherein the equipment authentication step further comprises transmitting, to the user device, a start-up available message comprising a start-up input available time indicating that the construction equipment is switched to the startable state, and
   further comprising:
      when the construction equipment is not started within the start-up input available time, switching the construction equipment into a non-startable state.

2. The user authentication method for construction equipment of claim 1, wherein the user identification information comprises a biometric information, and
   the user information registration step comprises:
      receiving the biometric information from the user device through confirmation of an owner device of an owner who owns the construction equipment; and
      registering the received biometric information in a server.

3. The user authentication method for construction equipment of claim 1, wherein the digital key issuance step comprises:
- receiving a construction equipment use request message from the user device through confirmation of an owner device of an owner who owns the construction equipment; and
- transmitting, to the user device, the digital key generated according to the construction equipment use request message from the user device.

4. The user authentication method for construction equipment of claim 3, wherein the construction equipment use request message comprises a use time for the construction equipment.

5. The user authentication method for construction equipment of claim 3, wherein the digital key issuance step further comprises:
- transmitting a construction equipment list to the user device, upon receiving the construction equipment use request message from the user device through confirmation of the owner device.

6. The user authentication method for construction equipment of claim 5, wherein the generating of the digital key according to the construction equipment use request message from the user device comprises:
- when construction equipment is selected from the construction equipment list by the user device, generating the digital key corresponding to the selected construction equipment.

7. The user authentication method for construction equipment of claim 3, wherein the digital key issuance step further comprises:
- updating a construction equipment list and a digital key issuance status for each construction equipment and storing it in a server.

8. The user authentication method for construction equipment of claim 7, wherein the digital key issuance step further comprises:
- transmitting the construction equipment list and the digital key issuance status for each construction equipment to the owner device.

9. The user authentication method for construction equipment of claim 1, further comprising:
- starting-on the construction equipment,
- wherein a remaining use time for the construction machine is transmitted to at least one of the construction equipment in a start-on state and the user device.

10. The user authentication method for construction equipment of claim 1, further comprising:
- after the requested use time expires, turning off the construction equipment and then switching the construction equipment into a non-startable state.

11. The user authentication method for construction equipment of claim 10, further comprising:
- before turning off the construction equipment, transmitting a turn-off warning message informing in advance that the construction equipment is to be turned off to at least one of the user device and the construction equipment.

12. The user authentication method for construction equipment of claim 1, wherein a value of the digital key varies depending on a reception time of the server receiving the use request for the construction equipment from the user device.

13. The user authentication method for construction equipment of claim 1, further comprising:
- before the user information registration step, an owner information and equipment information registration step for receiving and registering an owner information and an equipment information of the construction equipment from an owner device of an owner who owns the construction equipment.

\* \* \* \* \*